United States Patent [19]

Gioello

[11] Patent Number: 4,546,434
[45] Date of Patent: Oct. 8, 1985

[54] METHOD FOR DESIGNING APPAREL

[76] Inventor: Debbie A. Gioello, 237 Van Cortlandt Park Ave., Yonkers, N.Y. 10705

[21] Appl. No.: 362,164

[22] Filed: Mar. 26, 1982

Related U.S. Application Data

[63] Continuation-in-part of Ser. No. 81,569, Oct. 3, 1979, abandoned, and a continuation-in-part of Ser. No. 101,763, Dec. 10, 1979, abandoned.

[51] Int. Cl.⁴ .............................................. G06F 7/30
[52] U.S. Cl. ..................................................... 364/300
[58] Field of Search .............................. 364/200, 900

[56] References Cited

U.S. PATENT DOCUMENTS 3,534,396 10/1970 Hart et al. ........................... 364/200
4,070,710 1/1978 Sukonick et al. .................... 364/900

*Primary Examiner*—Thomas M. Heckler
*Attorney, Agent, or Firm*—Blum, Kaplan, Friedman, Silberman & Beran

[57] ABSTRACT

A method for visually composing and editing original apparel designs including the steps of providing a plurality of configurations of individual garment components, such as bodices, sleeves, collars, skirts, yokes and the like, compiling a computer data base from which said components may be retrieved and assembled in finished apparel format on a fashion figure outline in selective composite fashion, thus visually displayed and compared on a graphic CRT and, if desired, modified by replacement of any component by selection of a new element from the data base, or by the use of an electronic locating instrument, or the design may be presented as permutation of any one or more selected parts. When a design is completed, its component CRT image is made available as hard copy, together, optionally alone or in conjunction, with hard copy of the corresponding pattern sections which can subsequently be used in cutting component parts comprising the design on suitable piece goods.

4 Claims, 28 Drawing Figures

METHOD FOR DESIGNING APPAREL

RELATED APPLICATIONS

Reference is made to my copending application Ser. No. 081,569, filed Oct. 3, 1979, abandoned; and Ser. No. 101,763, filed Dec. 10, 1979, abandoned, the present application being a continuation in part of both said applications.

BACKGROUND OF THE INVENTION

This invention relates generally to the field of garment design, and more particularly, to an improved method for obtaining one or plural designs using a number of drawing steps and associated research.

Particularly in the field of women's apparel, it is common for an apparel designer to design as many as thirty or more garments, during the course of a single day, from which an executive designer, stylist, marketing representative, manager or buyer will select possibly two or three designs. Such selections are necessarily based upon subjective considerations, and, accordingly, within reasonable limits, the greater number of designs from which to select, the greater is the likelihood of obtaining a satisfactory design or designs.

It is known in the art to provide work books in which pages are devoted to individual components of garments, such as collars, sleeves, skirts, bodices, and the like. The designer uses such books by starting with a sheet of tracing paper upon which a fashion figure has been printed. Next, a series of garment components are selected, and with each selection, the tracing paper is oriented by placing it upon the sketch of the desired component, and lining up the head and shoulders of the figure, such that the desired printed sketch can be traced in proper relative position. This procedure is continued until all of the required garment components have been selected and traced upon the figure. After examination of the completed drawing, component changes may be made by tracing all of the components except those where change is desired, or by erasing a component from an existing drawing, following which a new tracing of the desired component or part, using a different sketch from the work book, is made.

Using such techniques, an adequate representation of a drawing can be completed within a ten to fifteen minute period. However, repeating the process with successive designs is tedious, and, very often, the successive designs composed as a repeated process are very similar. In such process, a number of complete designs are discarded by the designer herself, with a corresponding waste or loss of design time. Often the substitution of a single element constitutes the entire difference between successive designs, and each entire design must nevertheless be fully completed to provide a basis for visual comparison. This is especially necessary where the final decision is not made by a designer, but by a person who often lacks the capability for high structural visualization.

It is known in the art to provide a computer based system in which representations of entire garment styles are stored and presented to a customer for sales purposes, with an opportunity for the customer or wearer to modify the design within predetermined limits with regard to their measurements. However, such system does not contemplate the actual design of a garment, but merely certain modifications to patterns used in manufacturing.

In using such a system, an existing style or pattern is initially selected by the customer from a catalog, and a catalog or identification number is inserted into the system to retrieve the finished pattern from a data bank. Such system is disclosed in U.S. Pat. No. 4,149,246 granted to Robert N. Goldman, April 10, 1979. Such system, however, does not permit actual design of a garment, but merely the modification of a previously created pattern. It is specifically used to custom tailor a pattern to the measurements of a client.

SUMMARY OF THE INVENTION

Briefly stated, the invention contemplates the provision of a series of garment component designs and one or more corresponding figure forms, the configurations of which are digitally recorded and stored in a computer data base. The interfaced computer is provided with a cathode ray tube graphic display, as well as means for providing hard copy. The components are retrievable on an ephemeral basis by giving commands in the form equivalent of pressing related keys on a keyboard in order to display various components of a desired composite design on the cathode ray tube display, it being possible to remove the display of a particular component when it is determined that it is not satisfactory, and substituting the display of another occurrence of the same component type until the design has been established to the satisfaction of the designer or user. At this point the design is permanently stored, given an identification number or identifying name and subsequently hard copy can be made and the designer or user provided with a permanent representation of the design. A series of such designs can also be produced by merely altering one or more of the components comprising the design, and further hard copy can also be made for purposes of comparison, or multiple designs may be compared together on the CRT screen. As part of the printout, it is possible to print selected piece goods patterns, together with relative information pertinent to such piece goods, specifications relative to the pattern, construction and sizing as well. It will be apparent that designs can be made with a total absence of any manual sketching, or in the cases where the design is to partially consist of components which are not in the data base, supplemental sketching can be produced either before or after the printout is made, using the computer facility or by actually sketching onto the printout report.

BRIEF DESCRIPTION OF THE DRAWINGS

In the drawings, to which reference will be made in the specification, similar reference characters have been employed to designate corresponding parts throughout the several views.

FIG. 4 is a schematic view showing the composite of FIG. 1, and selections from FIGS. 2 and 3 in assembled condition, as may be viewed upon a cathode ray tube display.

FIG. 5 is a corresponding schematic rear view.

DETAILED DESCRIPTION OF THE DISCLOSED METHOD

Figure 1:
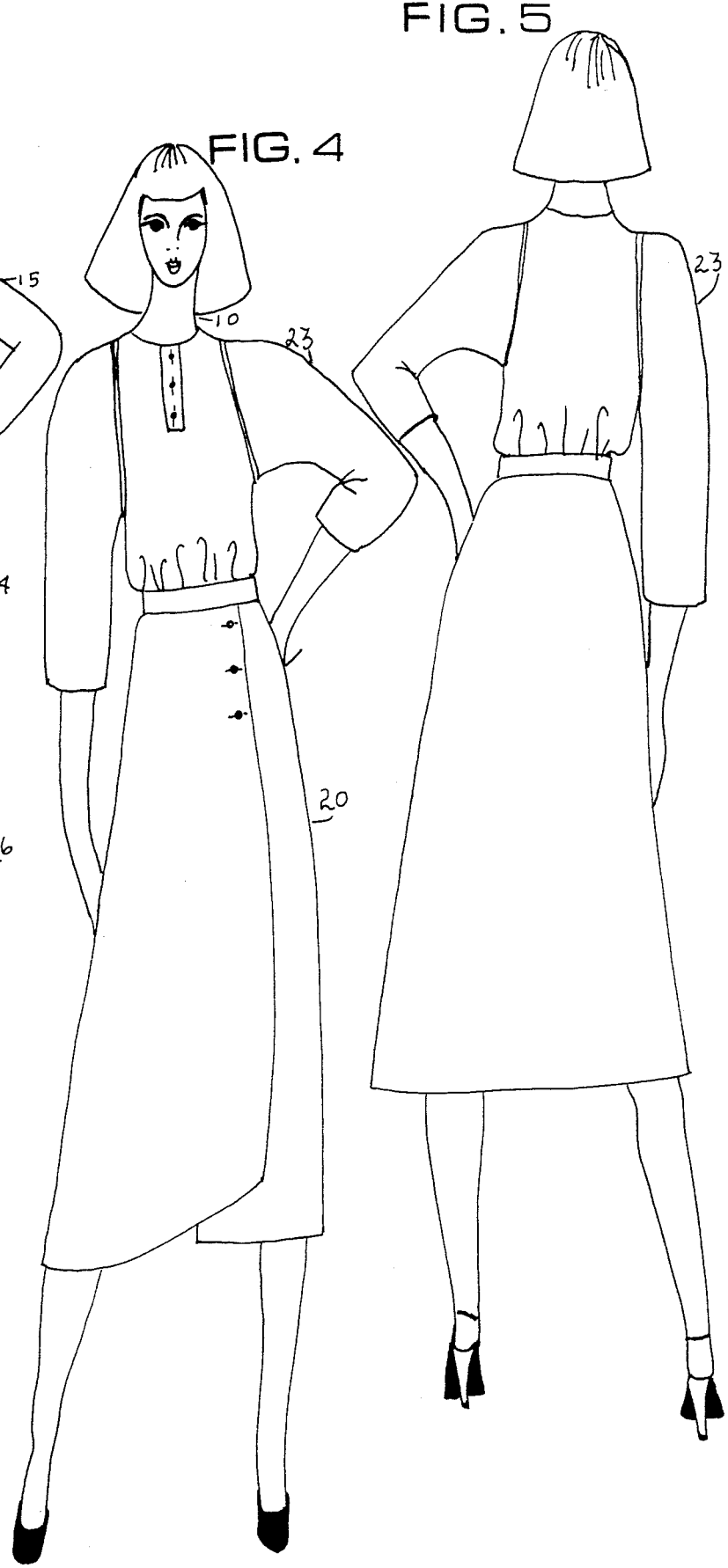
FIG. 1 is a schematic view of a fashion figure forming part of a completed design in accordance with the invention.

In accordance with the invention, and referring to FIG. 1 in the drawing, reference character 10 designates a sketch of a fashion figure of known type, including a head portion 11 and neck portion 12, an upper torso portion 13, a lower torso portion 14, arms 15, and legs 16.

Figure 2:
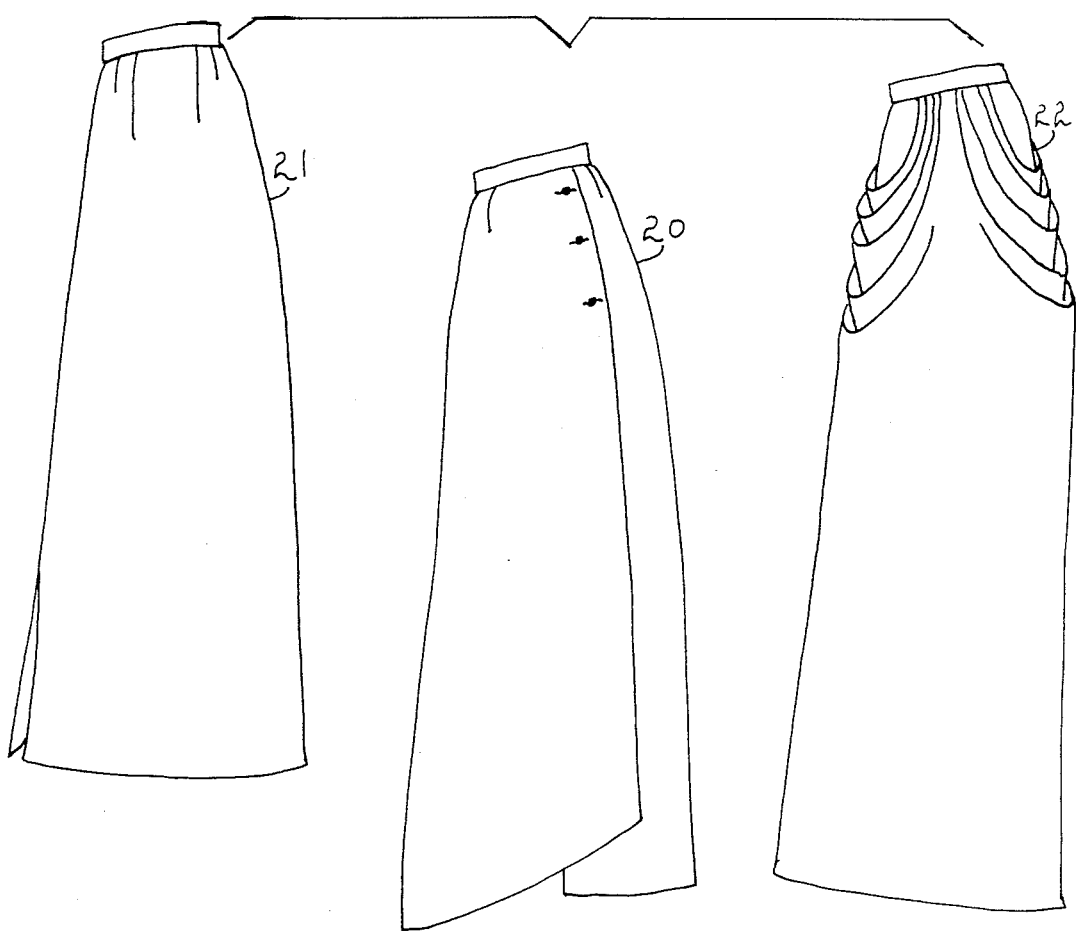
FIG. 2 is a schematic view showing a plurality of possible skirt components, any of which may be selected as a part of a composite design.
Figure 3:
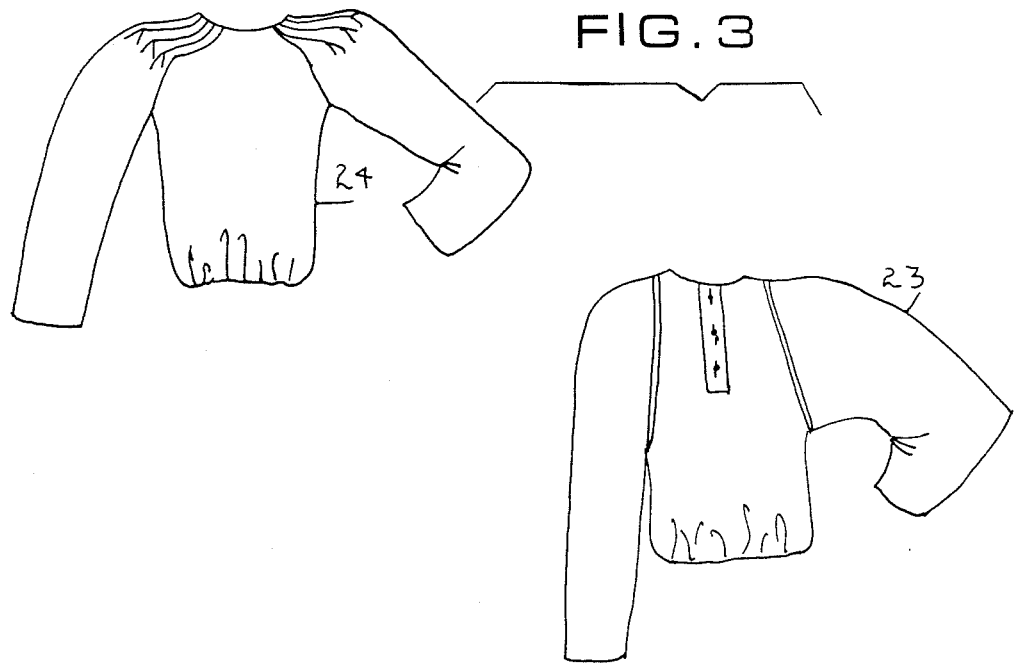
FIG. 3 is a similar schematic view showing a plurality of combination bodice and sleeve components, any of which may be selected as a component part of the same design.
Figure 6:
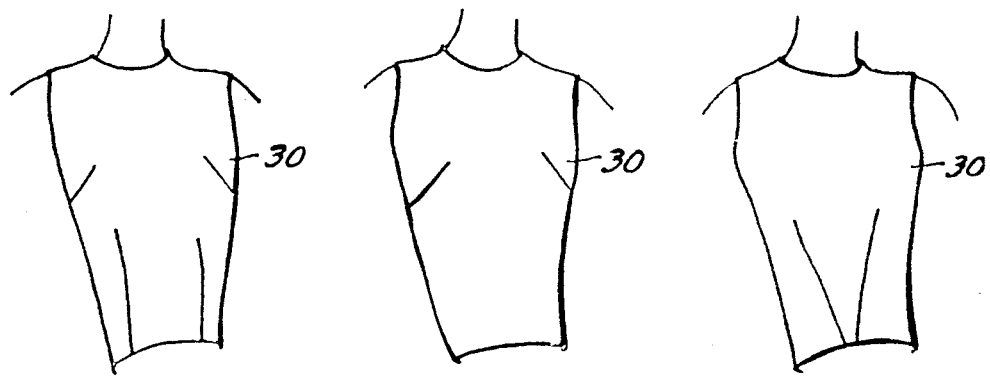
FIG. 6 is a schematic view showing a plurality of individual bodice components.
Figure 7:
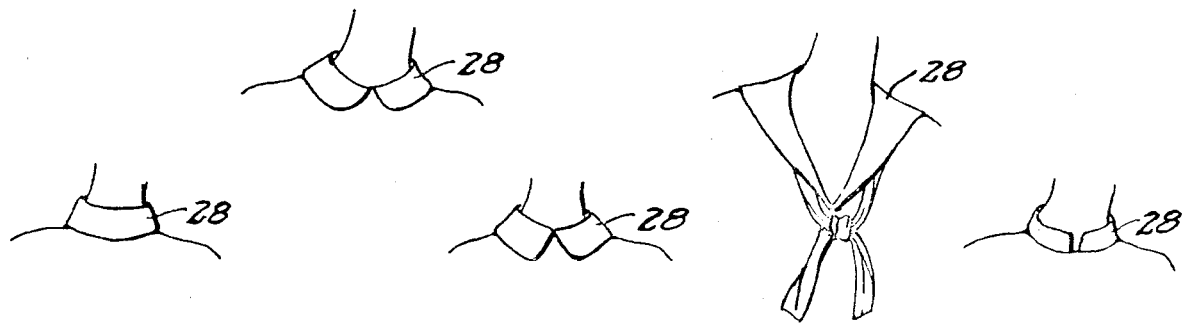
FIG. 7 is a schematic view showing a plurality of individual collar components.
Figure 8:
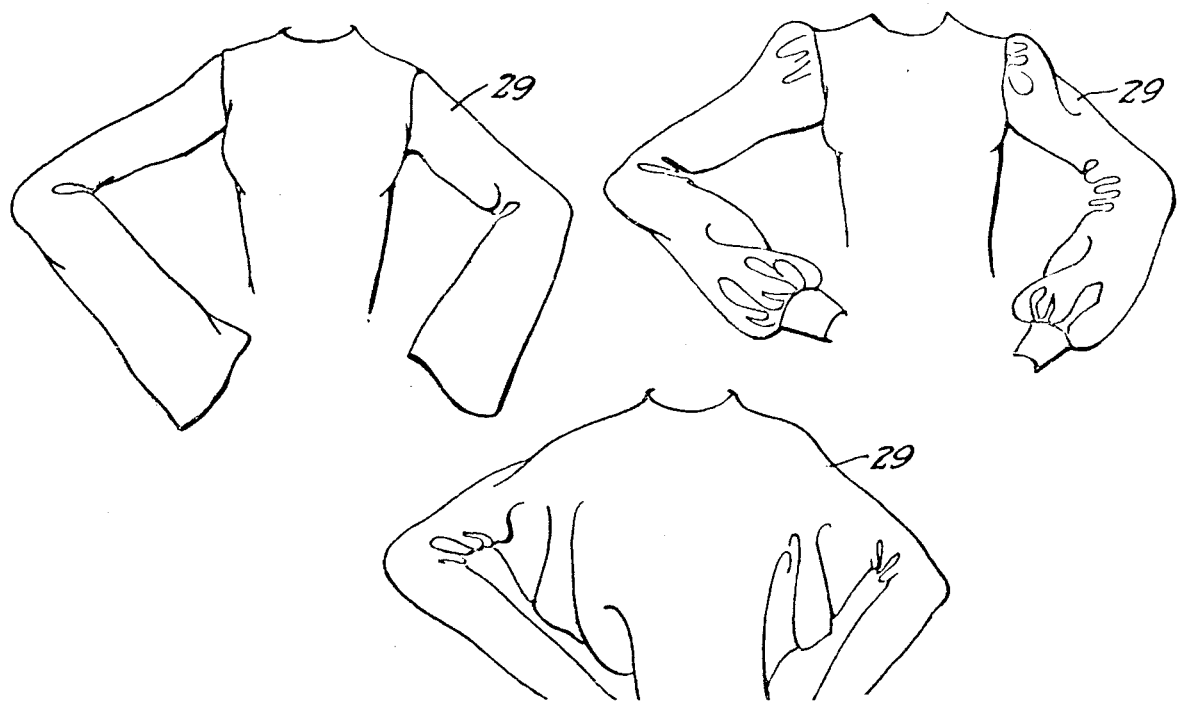
FIG. 8 is a schematic view showing a plurality of individual sleeve components.
Figure 10:
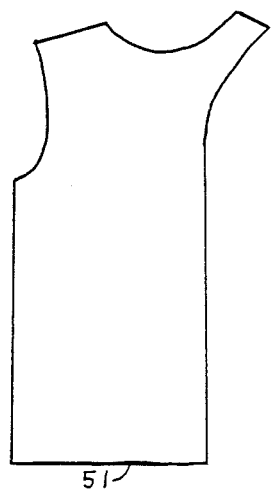
FIG. 10 is a front elevational view of a pattern of a front panel, comprising a component of the design shown in FIG. 9.
Figure 11:
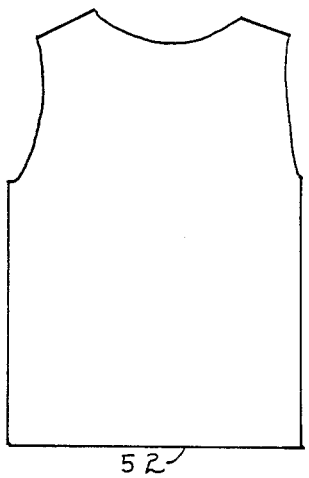
FIG. 11 is an elevational view of a pattern of a back panel.
Figure 12:
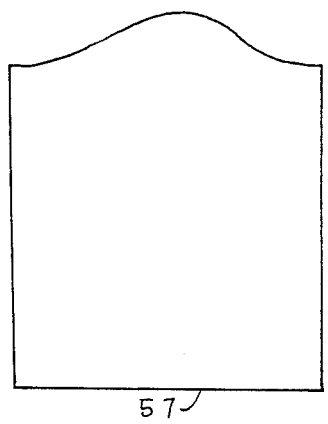
FIG. 12 is an elevational view of a sleeve element.
Figure 13:
FIG. 13 is an elevational view of a pattern of a first pocket.
Figure 13A:
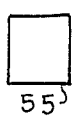
FIG. 13a is an elevational view of a pattern of a second pocket.
Figure 14:
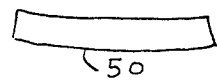
FIG. 14 is an elevational view of a collar.
Figure 15:
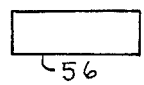
FIG. 15 is an elevational view of a bound cuff.

FIG. 2 illustrates a plurality of skirt design portions 20, 21, and 22, which may in many cases be borrowed from a single page of a work book, and which are configured to match the fashion figure 10 shown in FIG. 1. FIG. 3 shows corresponding sleeve designs 23 and 24. It will be understood that other components exemplifying collars, belts, and the like, may also be prepared, and as many variations of each component are stored in a computer data base. Additional fashion figures (not shown) corresponding to the fashion figure 10, and showing other aspects of the figure, as for example, front, left and right sides, are also prepared and stored in the data base, there being corresponding displays of the design portions of each garment component as well.

FIGS. 4 and 5 illustrate a composite display as might be seen on a cathode ray tube in which an individual component from each of FIGS. 2 and 3 is placed in superimposed relation upon the fashion figure 10. This superimposition is accomplished by merely pressing keys on a keyboard, or a combination of keys, or the equivalent, to provide an address to the desired component in storage, in standard indexed fashion, and the remaining parts of the component design are accomplished in a similar process.

When the completed design is displayed, the designer then has an opportunity to consider the design from the standpoint of possible improvement. Upon viewing the entire design, it may be deemed desirable to replace an individual component, such as a sleeve, and this is accomplished by cancelling the display of the sleeve component present on the cathode ray tube and substituting another sleeve component. The process may be continued as long as desired until total satisfaction has been obtained. At this point, the design is stored and can be transferred to printout means, and FIGS. 4 and 5 illustrate a typical representation, in which each component designated by using a different printout character, such as X's, Y's, A's, O's, and the like, or when using the printer-plotter, by the use of different color pens for plotting different components, alternate use of a CRT camera to photograph the image of the design off the CRT may also be performed.

It will be appreciated that the composition of the first of a series of designs may require a certain amount of research time on the part of the designer. However, succeeding similar designs, which may vary only in a single component, can be readily created by merely retaining the previous display during the printout function, and subsequently altering only the desired component, following which another printout may be made. Thus, since no manual sketching is required, after initial research, a skilled designer may create hundreds of possible designs during the course of a single session and have saved an enormity of redundant sketching and examination as well as time and physical energy at completion.

The designer, in an alternate approach, may use the data base to establish a given or fixed design while exploring in rapid fashion variations or combinations of variations to one or more components at a time. For example, the designer may select a bodice from the data base and have a repetitive display of that bodice with all of the different sleeves and/or all of the different collars, or a selection of bodice and skirt combinations may be made with a subsequent selection of any of the sleeves, collars and the like, and at the user's discretion, without displaying the fashion figure, or any of the other components, the presence of which might detract from consideration of the desired components.

From a desired printout or CRT photograph, it is, of course, possible to manually create corresponding patterns which may be duplicated in a variety of sizes for the purpose of fabricating selected designs.

As is known in the art, patterns are placed upon the fabric, and the fabric cut in accordance therewith, prior to sewing together to complete the garment. In accordance with the present invention, these patterns are prepared and stored in the data base in a digitally reproducable manner so that they may be displayed upon the cathode ray tube by pressing appropriate keys, exactly as the components are displayed in draped form upon the fashion figure. Thus, upon the completion of a design and its subsequent printout, the corresponding components may also be displayed on the cathode ray tube, for checking, and obtained as a subsequent printout to form part of the complete file of a given design. When subsequently approved, the corresponding pattern sections are already present and need not be redrawn. The sample size pattern can be expanded or reduced by grading methods to any or all of a variety of sizes using computerized plotting means, known in the art, as exemplified by that disclosed in U.S. Pat. No. 4,058,849, granted Nov. 15, 1977 to William J. Fitzgerald.

Figure 9:
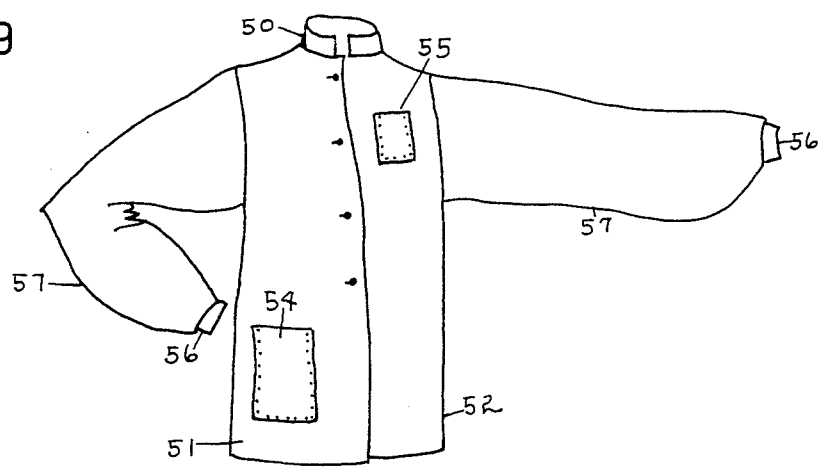
FIG. 9 is a front elevational view of a blouse comprising an exemplary selected design.

When the selection of designs is finalized, the computer, by selection will print out all the corresponding pattern pieces of the components and parts of the garment needed to cut out piece goods and subsequently construct or fabricate the desired garment. Specifications relating to and regarding length of seams, widths of hems, dimension of collars, cuffs, pockets, and other details may also be requested and included. Following the completion of the design, each of the individual components 51–57 may be separately viewed on the cathode ray tube, and printed out on separate sheets for subsequent separation. Referring to FIGS. 9 through 15, inclusive, in the drawings FIG. 9 illustrates an original composite design, designed, edited and finalized by the user, generally indicated by reference character 50 with corresponding pattern pieces FIGS. 10 through 15. This design can be constructed into a finished garment by assembling the pattern piece, first and second front panels 52 with a rear panel 53, application of pockets 54 and 55 thereon shown in FIG. 9. A cuff 56 is sewn to each sleeve 57, thereon until garment is completed.

DESCRIPTION OF HARDWARE

Figure 16:
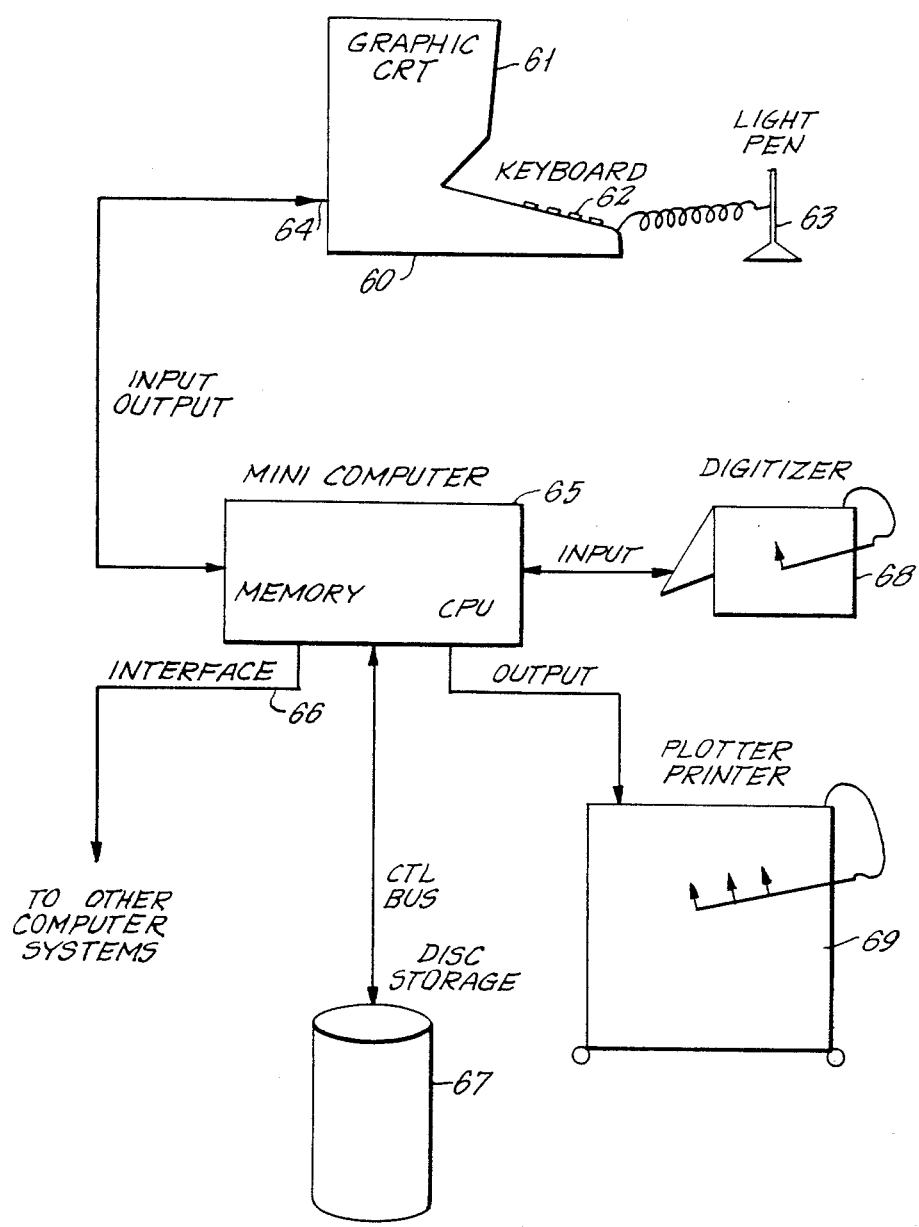
FIG. 16 is a schematic view showing minimum, although expandable, computer hardware required for implementing the disclosed method.

Referring to FIG. 16 in the drawings, there is illustrated a simple access facility for implementing the disclosed method. This facility will include a console 60, at which the designer may be seated, the console including a graphic cathode ray tube 61, a keyboard 62, and a light pen 63 of known type. The keyboard 62 is interfaced at 64 with a mini computer 65, the computer in turn being interfaced at 66 for communication with other computer systems, and to disk storage 67, a digitizer 68 and a plotter printer 69. As all of the components 60–69 are readily commercially available, they need not be described in great detail. Suitable digitizing terminals, for example, might be Model OPTEC 30, available from Autotrol Technology Corporation of 1250 North Washington Street, Denver, Colo. Equally suitable is Series 800 available from California Computer Products of 2411 West La Palma Avenue, Anaheim, Calif. A suitable color graphics cathode ray tube is available under Model AED/512, from AED Incorporated of 440 Potrero Avenue, Sunnyvale, Calif., as is Model 374 available from Systems Research Laboratories of 2800 Indian Ripple Road, Dayton, Ohio. A suitable plotter printer is available under Model 106X from California Computer Products, above mentioned, and an equally suitable unit is available under Model 7220 from Hewlett Packard Corporation of 16399 West Bernardo Drive, San Diego, Calif. Where desired, printout may be obtained through the use of CRT color camera, as for example, Model 4000 available from Matrix Instruments of 230 Pegasus Avenue, Northvale, N.J. A wide variety of central processors (mini computers) is also available. Typical are Model HP 1000 available from Hewlett Packard, above mentioned, and Series I available from IBM Corporation. While most central processor units utilize disk storage of the specifications of the manufacturer, many microprocessor base systems have available a wide variety of disk units. In addition, practically all central processor units have a wide number of tape or telecommunications interfaces available for use, where the equipment will be installed in more than one location.

DESCRIPTION OF SOFTWARE

Upon commencing operation, the user is presented with a menu, which by selecting one of the choices upon it, will cause the computer to execute that design function. The menu is displayed upon the CRT and offers the following choices:

| | |
|---|---|
| 1 | START or CONTINUE a GARMENT DESIGN SESSION |
| 2 | PRINT OUT a COMPLETE GARMENT and COMPONENT LIST |
| 3 | PERUSE THRU the COMPONENT DATABASE |
| 4 | PERFORM a FABRIC ANALYSIS |
| 5 | COMPARE DESIGNED GARMENTS |
| 6 | PURGE UNWANTED DESIGNS or COMPONENTS from DATABASES |
| 7 | PRINT ANALYSIS STATISTICS |
| 99 | SHUT DOWN DESIGNER SYSTEM |

Function 2 activates the printer plotter unit, and causes a user entered named garment design to be printed out along with the components' identifying numbers (which were selected by the designer).

Function 3 allows the user to examine "images" of previously stored components in order to find one, enter a new one, or modify any existing one. While examination is done by visual method, all data is stored or modified with "data records" stored on disk.

Function 4 causes display or print of a fabric analysis report from data derived from a design previously selected by the designer (using function 1 which will be described later).

Function 5 causes the comparative display or print of multiple garments which were designed by the designer using function 1.

Function 6 allows any garment which was designed or any component entered or modified during perusal (function 3) to be deleted (eliminated) from the system. It also makes the space previously occupied by the item purged available for any system use.

Function 7 prints the statistics for a particular garment which had been designed previously in function 1.

Design Functions

Function 1 will cause a human figure outline to be displayed upon the screen of the graphic CRT. Next, the user will be prompted for entry of a "yes" or "no" response to the question: "Should I first continue from a previously designed garment!". If the response is "yes", the system will first superimpose the previously designed garment (after getting its name from the user) upon the model human figure on the CRT screen, then will proceed to the next step.

Next, the following sub-menu of choices will appear below the figure on the screen:

| | |
|---|---|
| 1 Add/Replace Component | 2 Color or Fabric Pattern Component |
| 3 Alter Component | 4 Overlay Alternate Component |
| 5 Remove Component | 6 Save Garment |
| | 99 Exit Session |

Choice 1 will allow a component identification to be entered. The system will automatically position the component at the right point on the model figure. If a component has already been placed at that point, it will be replaced and forgotten.

Choice 2 will allow a color or fabric pattern from two hundred fifty six choices to be filled into a component. If a color was already there, it too will be replaced and forgotten.

Choice 3 will allow a component to be slightly modified in place on the model as far as its positioning, seaming, and relative size. Modifications will only be saved with the garment being designed, unless a special command instructs the system to remember them as a "new garment component".

Choice 4 will allow either the actual double superimposition of a second component over a first or will allow rapid switching back and forth between multiple choices of individual components of a single type (i.e. sleeves or legs, but not both at the same time).

Choice 5 will simply remove a component from the displayed garment design. A recall function command will allow the last removed component from any location on the model figure to be repositioned upon the screen.

Choice 6 will allow either the simple saving of a garment design for future modification or printing out, or it will allow a temporary copy of a design to be held in a waiting area and displayed to the right of the working copy. Depending upon the model of the design system, a variable number of temporary copies will be able to be displayed along with the working copy, and any of them saved as a finished design.

Figure 17:
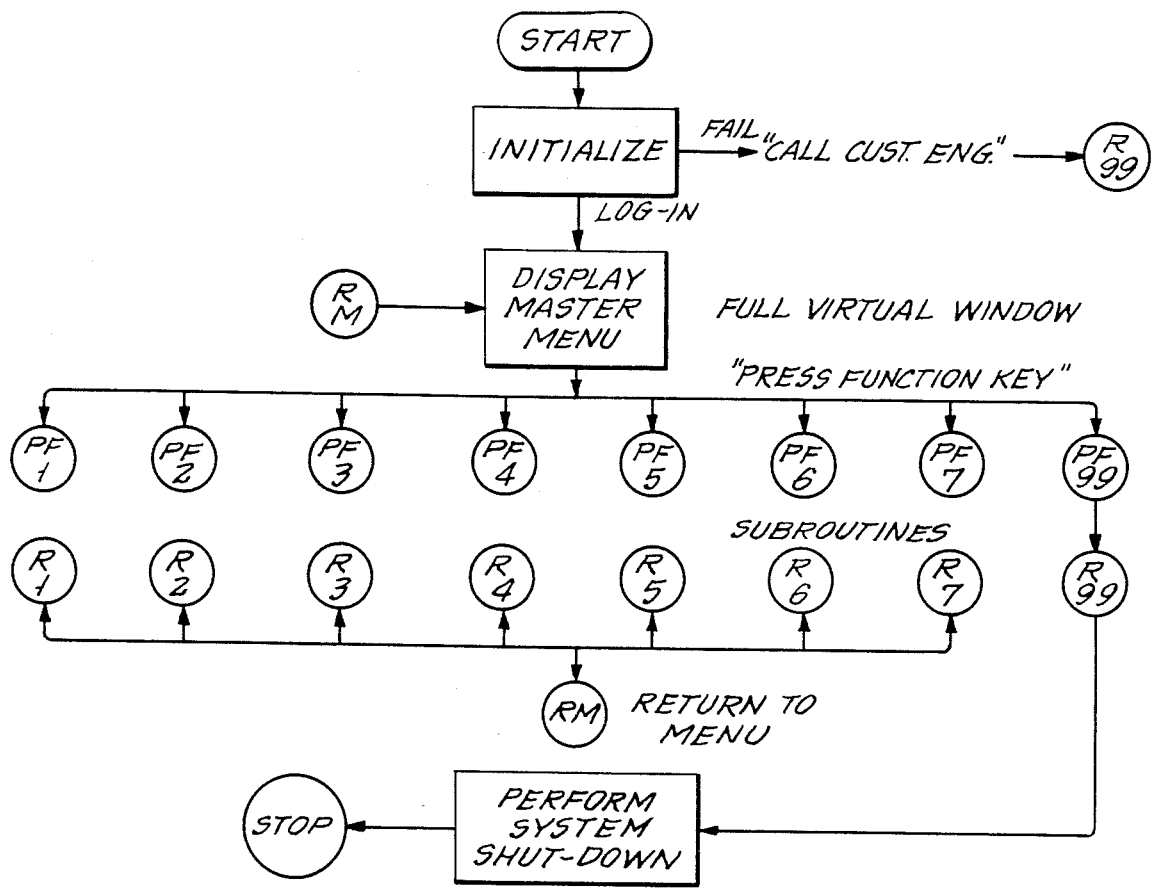
FIGS. 17 through 24, inclusive.

Referring to FIG. 17 in the drawing, there is illustrated a program corresponding to system function 1 whereupon commencement of operation, the display master menu is retrieved from memory to display the available functions, which are in turn initiated by pressing the proper press function key which transfers through the associated connector Pfn to the associated subroutine as described above. At the completion of each function, the flow of the programmed subroutine passes to the connector designated "R" followed by the number of the function resulting in a return to the display of the master menu. As many functions as desired may be successively employed, following which the key designated "pf99" is pressed to discontinue the operation of the system.

Figure 18:
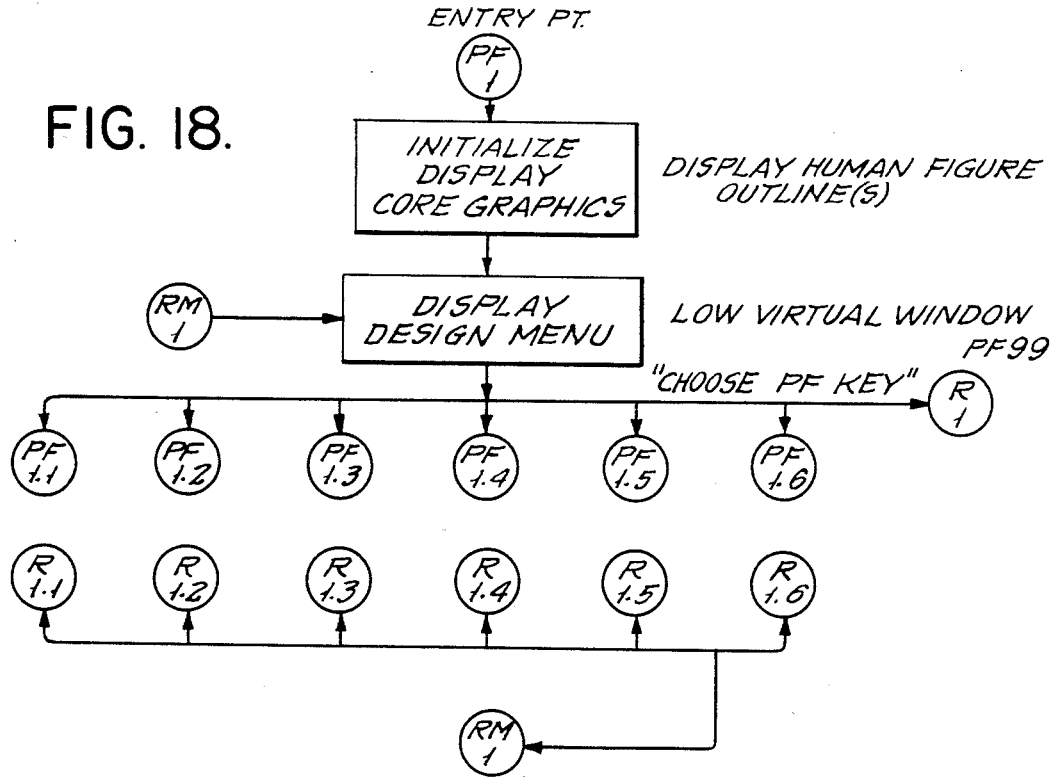

FIG. 18 illustrates a subroutine followed immediately after initiation of operation, showing the display of a human figure prior to the placing of garment components, with a separate display of the second level design menu, and subfunction selection logic.

Figure 19:
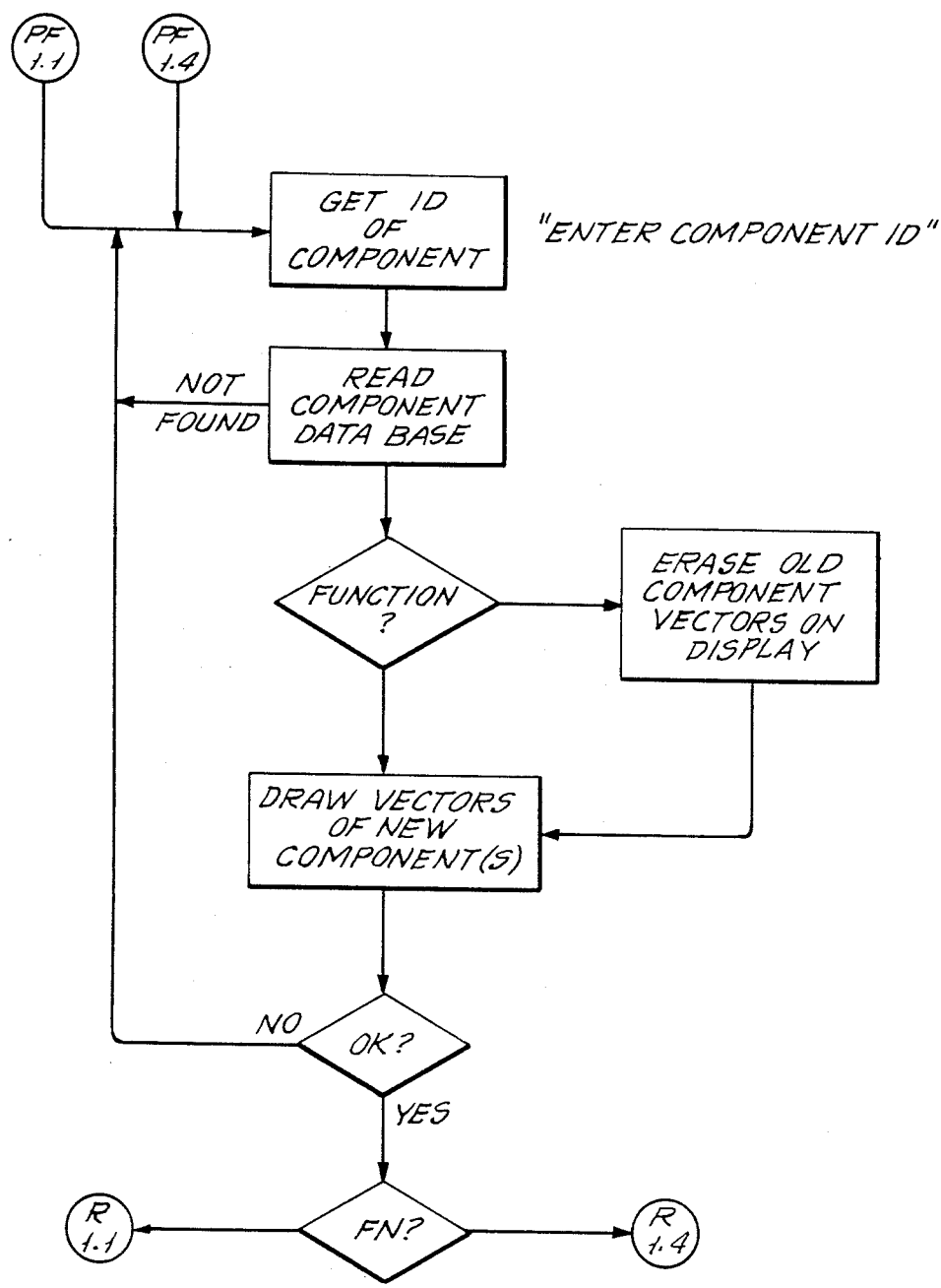

FIG. 19 illustrates a subroutine employed during system function no. 3, that is the perusing through the component data base in serial fashion.

Figure 20:
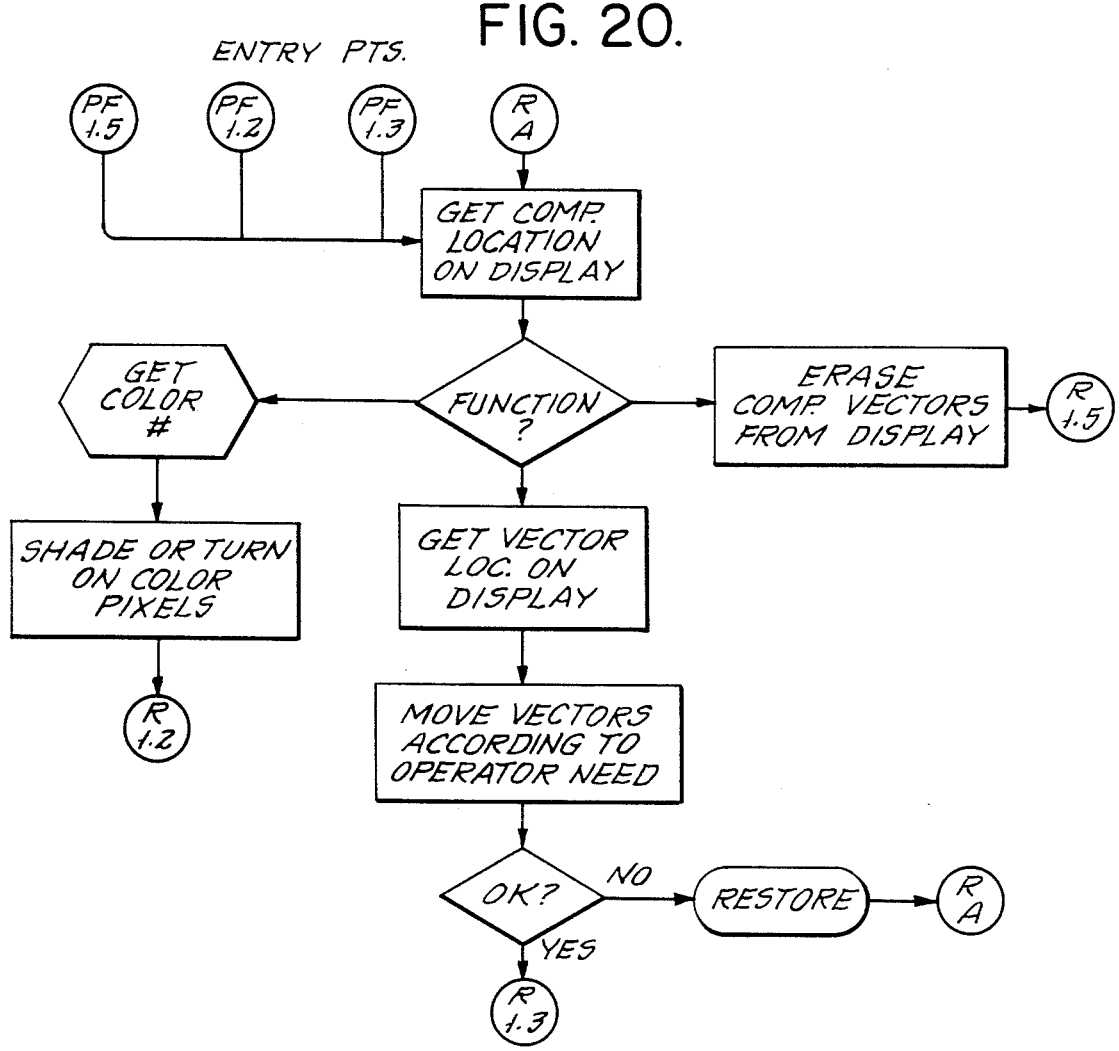

FIG. 20 illustrates a subroutine employed during system functions 2, 3, and 5, in the process of designing the garment, culminating in selection of fabric or color, a perusal through the component data base, a comparison of the design garments (function 5), and an ultimate printout (function 2).

Figure 21:
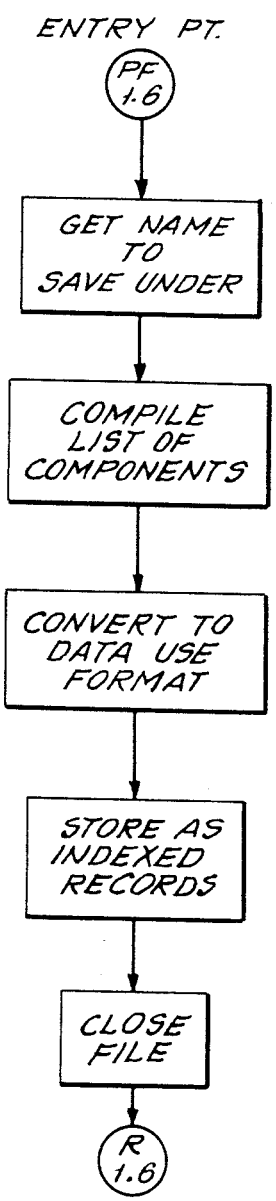

FIG. 21 illustrates the program followed during the entry of data for a completed design which is placed in storage for subsequent retrieval (function 6). In this function, unwanted designs or components are retrieved from the data bases to afford more storage space, and ultimately stored as indexed records.

Figure 22:
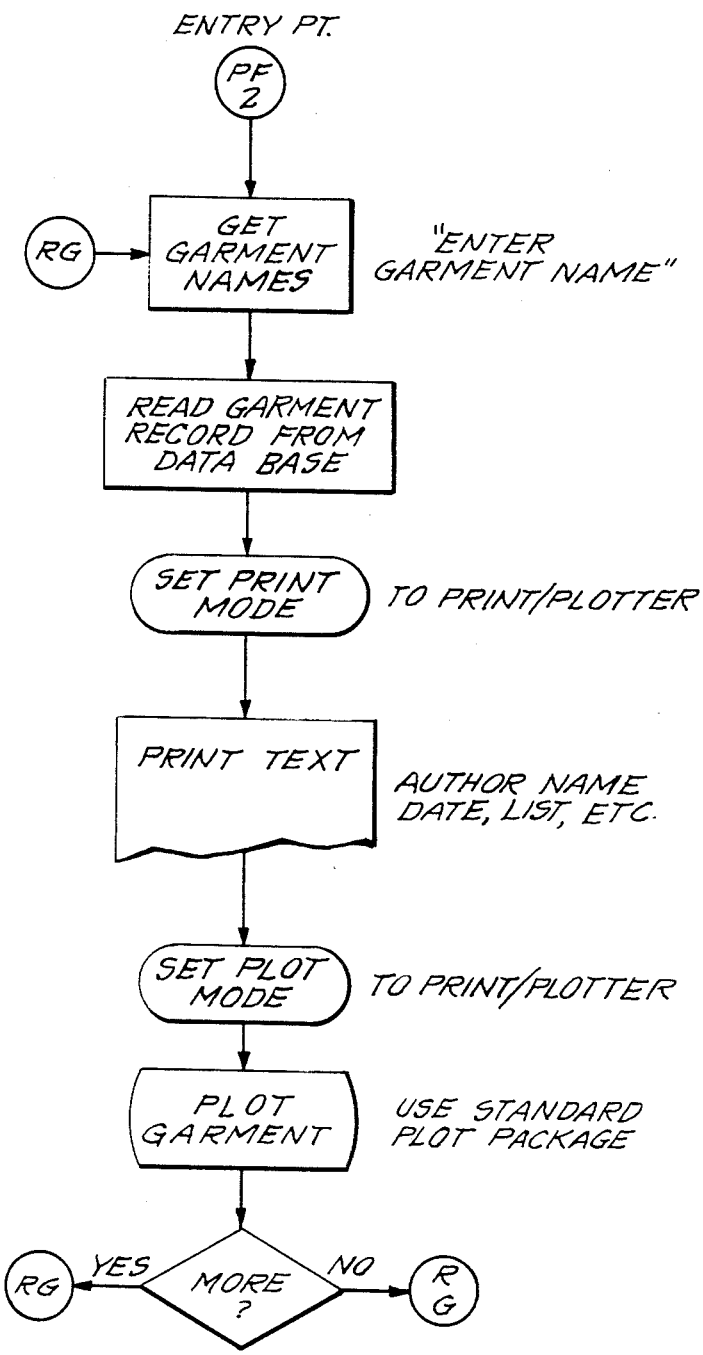

FIG. 22 illustrates the program for printing and plotting (function 2).

Figure 23:
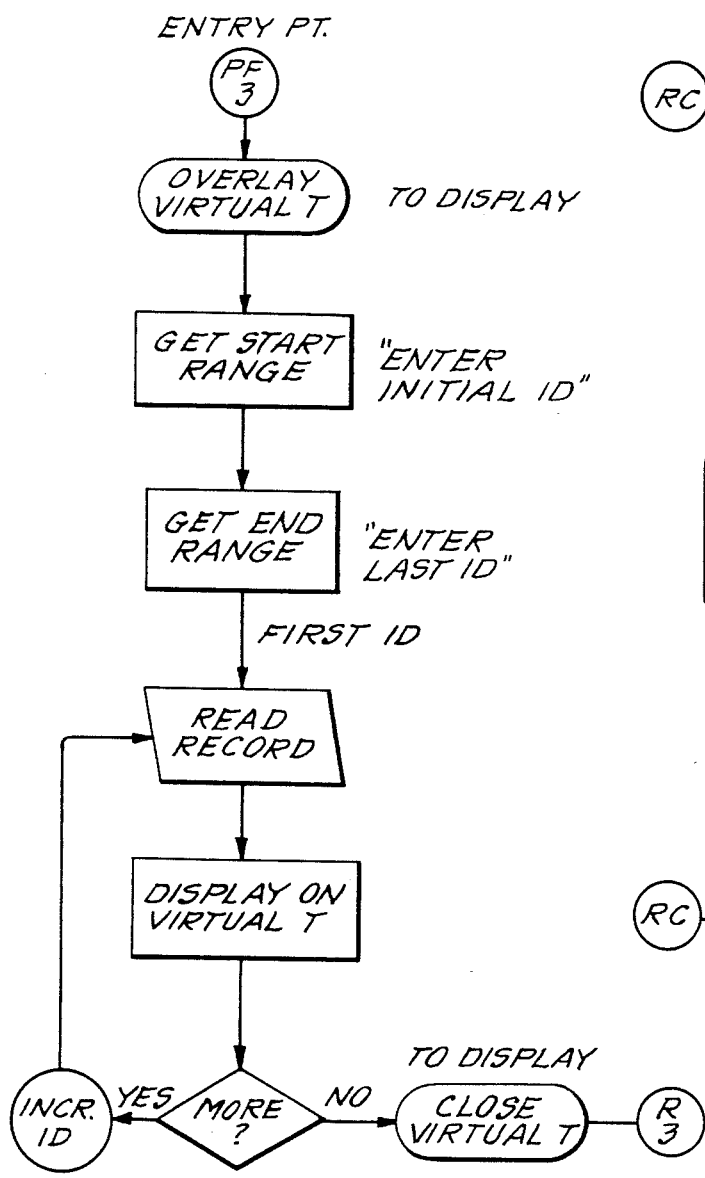

FIG. 23 illustrates the program for function 3, perusal through the component data base, without more.

Figure 24:
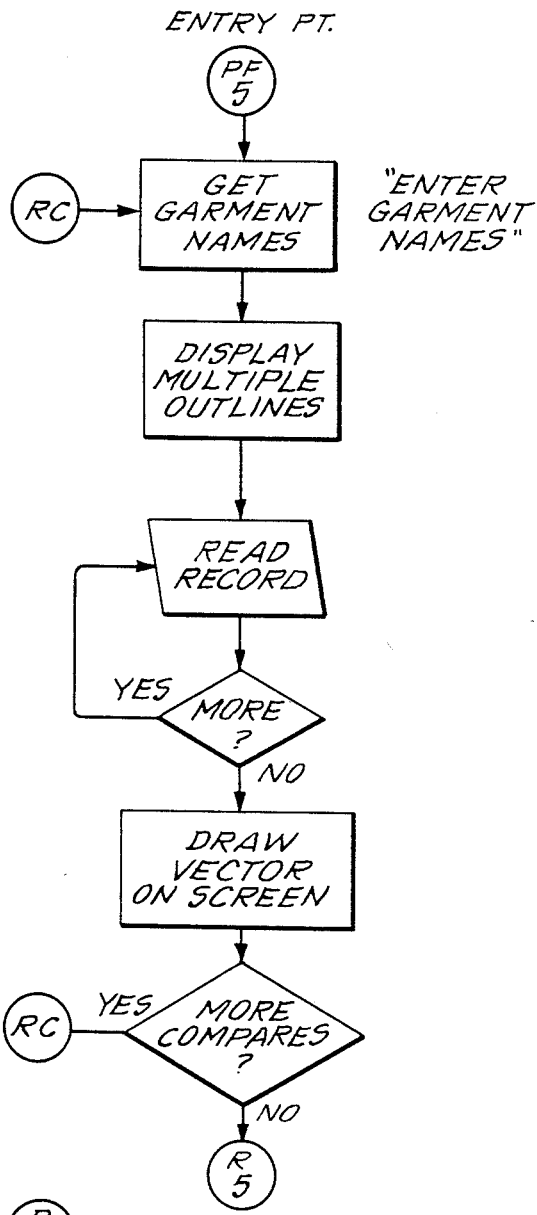

FIG. 24 illustrates the program for function 5, a comparative display subsystem, in which multiple outlines are displayed seriatim for final selection.

Figure 25:
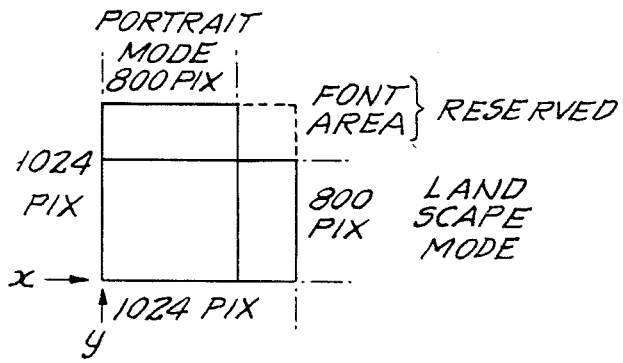
FIG. 25 is a schematic representation of a screen layout forming part of a visual display.

FIG. 25 illustrates a typical screen layout on the cathode ray tube, wherein an upper portion of the tube may be reserved for message display, and a lower portion of the tube reserved for vector display.

Figure 26:
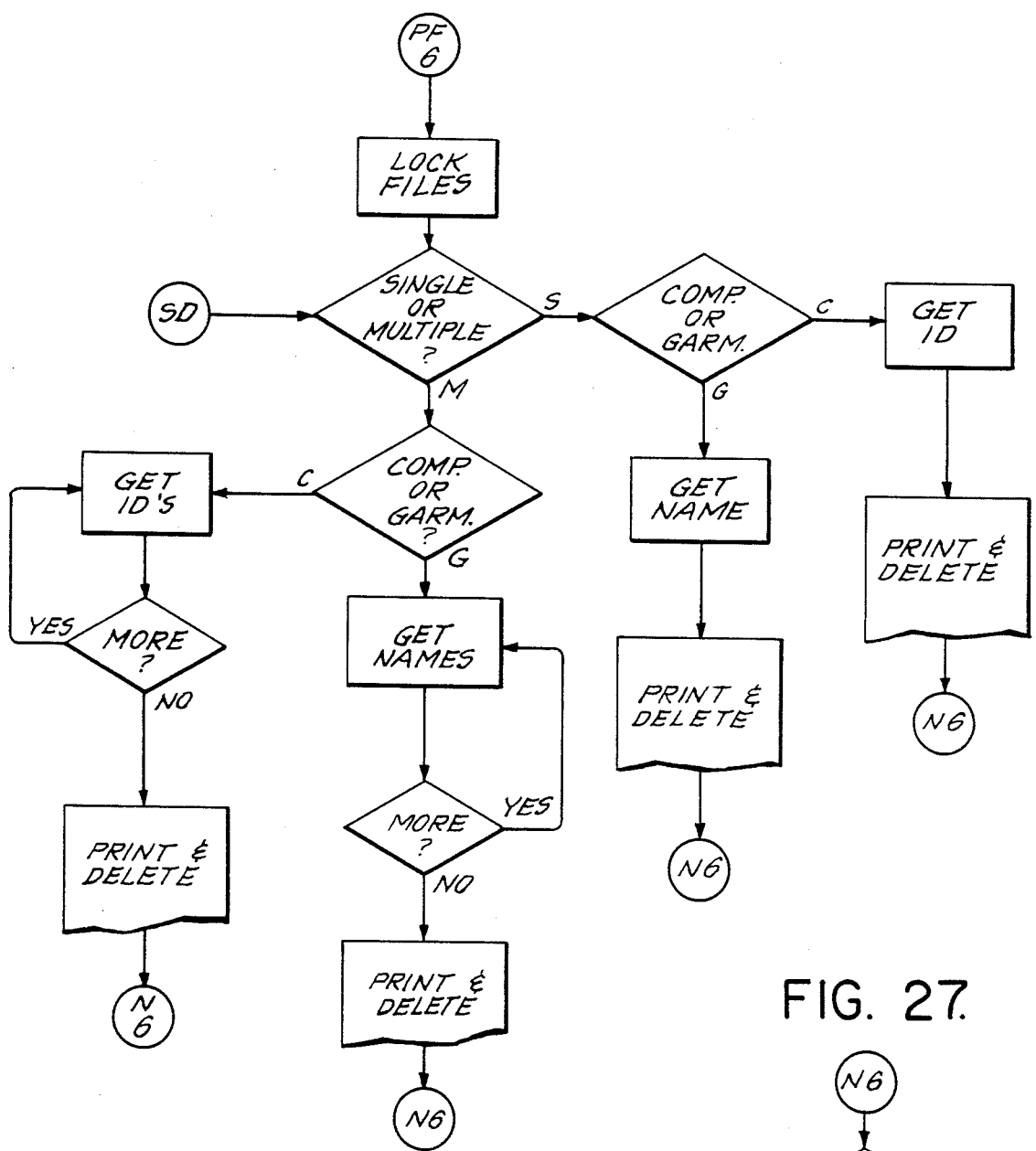
FIGS. 26 and 27 are schematic representations of program routines implementing the use of the hardware shown in FIG. 16.

FIG. 26 illustrates a program for closing out of the data base certain information printed and stored in a library.

Figure 27:
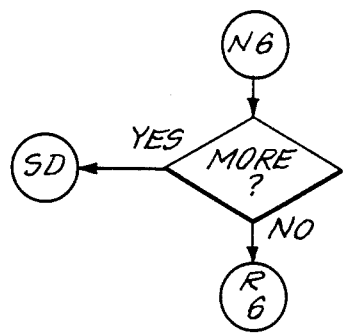

FIG. 27 is an adjunct program which may be appended to the lower left hand portion of FIG. 26.

Reference is made to FIGS. 17 through 25, as an example of one function of the program, illustrated is the flow through the flow chart "Save Garment". Beginning from start of FIG. 17, the program passes to initially allow the operator to log in and display the master menu. Since "Save Garment" is a garment design editing function, the operator presses PF key 1 to enlist garment edit function.

The program passes to a connector which leads to an entry point pf1 on FIG. 18. The garment edit subsystem takes control in calling the graphic display logic and displays the fashion figure outline. A small menu of garment designs functions is placed below the fashion figure outline and the operator is prompted to choose a PF key.

Since "Save Garment" is required in the save garment return, the operator presses pf6 which transfers the control to off page connector pf1.6 which in turn passes control to entry point table pf1.6 on FIG. 21. NOTE: normally this function would only be selected after a design would be completely displayed on the fashion figure outline.

Enter point 1.6 first causes the system to prompt the operator for a name or ID (identification) to save the design under or to file the newly created design from the selected components. Then it (the system) composites a list of components selected from the design on the screen out of the temporary memory. The system converts these to a numerical, rather than a graphic, list of component ID (which points back to component images) and stores them as standard index records along with other discretely associated information such as another name, date or other analagous data. A system level catalog file operation is performed to ensure the integrity of the data base.

Control passes to return to a connector passing back to a reentry point labeled R1.6 on FIG. 18. This passes control to a connector labeled RM"1" which causes the redisplay of the desired menu below the fashion figure outline. At this point the operator may terminate the desired function by pressing Pf99 which passes control to R1 on FIG. 17. This in turn passes to connector RM which redisplays another menu of functions on the screen.

At this point the system may be terminated by Pf99 which is a sudo connector passing control to connector RM99 which executes logic to perform a system shutdown. At this point execution stops.

It may thus be seen that I have invented a novel and highly useful improved method for creating apparel designs, and for facilitating the initial stages of production, by means of which resort is made to existing computer technology to materially simplify and expedite the preparation of a plurality of graphic representations of apparel designs from which selections can be made. To maintain the cost of necessary equipment at a reasonably low level, it is necessary only that sketches be prepared by the designers and submitted to a processing center having facilities for preparing and storing the data base. The designer may be employed at an establishment having computer terminal provisions, a cathode ray tube display and printout means.

I wish it to be understood that I do not consider the invention limited to the precise details of structure shown and set forth in this specification, for obvious modifications will occur to those skilled in the art to which the invention pertains.

I claim:

1. A method for computer aided design of apparel, comprising the steps of:

providing computer means including visual display means, data input means and printout means for generating a permanent record of computer output;

designing at least one fashion figure on which said apparel design may be selectively and compositely superimposed;

designing a plurality of garment components;

providing a plurality of planar patterns, each of said patterns corresponding to one of each of said garment components;

converting each of said fashion figures, said garment components and said patterns into a form which may be stored, manipulated and output by said computer means;

creating a data base accessible by said computer means containing said converted fashion figures, converted garment components, and converted patterns, said data base linking said converted patterns to said corresponding converted garment components, said data base further linking similar converted garment components into converted garment component classes;

progressively designing apparel by displaying on said visual display means at least one converted fashion figure and superimposing at least one converted garment component selected from said data base on said converted fashion figure display;

outputting to said printout means a reproduction of said visual display means; and outputting to said printout means a converted pattern retrieved from said data base and corresponding to each of said converted garment components visible on said visual display means.

2. The method for computer aided design of apparel, as claimed in claim 1, further comprising the steps of inputting to said computer means through said data input means the desired size of the resultant converted patterns, and scaling the output from said printout means of said at least one converted pattern to the size input.

3. The method for computer aided design of apparel, as claimed in claim 1, comprising the additional steps of expanding said data base to include fabric data and color data, choosing a fabric and color to correspond to each converted garment component and outputting to said printout means fabric data and color data corresponding to each output converted pattern.

4. The method for computer aided design of apparel, as claimed in claim 3, wherein said fabric data is used to modify said output converted pattern.

* * * * *

(12) REEXAMINATION CERTIFICATE (4643rd)
United States Patent
Gioello

(10) Number: US 4,546,434 C1
(45) Certificate Issued: Sep. 17, 2002

(54) METHOD FOR DESIGNING APPAREL

(75) Inventor: Debbie A. Gioello, 237 Van Cortlandt Park Ave., Yonkers, NY (US) 10705

(73) Assignee: Debbie A. Gioello, Yonkers, NY (US)

Reexamination Request:
No. 90/005,855, Nov. 9, 2000

Reexamination Certificate for:
Patent No.: 4,546,434
Issued: Oct. 8, 1985
Appl. No.: 06/362,164
Filed: Mar. 26, 1982

Related U.S. Application Data

(63) Continuation-in-part of application No. 06/081,569, filed on Oct. 3, 1979, now abandoned, and a continuation-in-part of application No. 06/101,763, filed on Dec. 10, 1979, now abandoned.

(51) Int. Cl.[7] ............................................. G06F 17/00
(52) U.S. Cl. ........................... 700/90; 700/87; 700/132; 707/104.1; 707/4
(58) Field of Search ........................... 700/90, 132, 87, 700/97, 130, 135, 136; 707/4, 104.1; 705/27; 345/418, 419

(56) References Cited

U.S. PATENT DOCUMENTS

| | | | |
|---|---|---|---|
| 3,534,396 A | 10/1970 | Hart | 700/182 |
| 3,614,410 A | 10/1971 | Bailey et al. | 358/1.6 |
| 3,636,328 A | 1/1972 | Korelitz et al. | 703/1 |
| 3,653,071 A | 3/1972 | Hill et al. | 716/12 |
| 3,693,168 A | 9/1972 | Halkyard et al. | 358/1.3 |
| 3,716,705 A | 2/1973 | Newell | 345/441 |
| 3,732,557 A | 5/1973 | Evans et al. | 345/179 |
| 4,058,849 A | 11/1977 | Fitzgerald | 358/1.2 |
| 4,070,710 A | 1/1978 | Sukonick | 345/517 |
| 4,149,246 A | 4/1979 | Goldman | 700/132 |

OTHER PUBLICATIONS

Matthews, a dissertation published by Mary Alice Matthews at least as early as 1976, entitled "Exploratory study of computer aided apparel and textile design and production in the State of Georgia."

Kunii, a journal article written by Professor Tosiyasu Kunii and others, entitled "An Interactive Fashion Design System 'INFADS'," listing a publication date of 1975, Computers and Graphics, vol. 1, No. 4, pp. 297–302.

Hyman, a book written by Anthony Hyman, entitled "The Computer in Design," listing a publication date of 1973. pp. 96–111.

Toray, a system developed in Japan, described in "Women's Wear Daily", listing a publication date of Jan. 30, 1978, Design–to–Production System made by Toroy.

Fay, a paper presented by Michael C. Fay at a conference held by the American Apparel Manufacturers Association at Georgia Institute of Technology in Oct., 1977, paper entitled Future Trends in Pattern Design.

Certified Copy of Deposition of Gioello Enterprises, Ltd., by Debbie Gioello, *Gioello Enterprises, Ltd. v. Mattel, Inc.*, (Docket No. 99–375GMS, District of Delaware), Nov. 2, 2000.

*Primary Examiner*—Steven R Garland

(57) ABSTRACT

A method for visually composing and editing original apparel designs including the steps of providing a plurality of configurations of individual garment components, such as bodices, sleeves, collars, skirts, yokes and the like, compiling a computer data base from which said components may be retrived and assembled in finished apparel format on a fashion figure outline in selective composite fashion, thus visually displayed and compared on a graphic CRT and, if desired, modified by replacement of any component by selection of a new element from the data base, or by the use of an electronic locating instrument, or the design may be presented as permutation of any one or more selected parts. When a design is completed, its component CRT image is made available as hard copy, together, optionally alone or in conjunction, with hard copy of the corresponding pattern sections which can subsequently be used in cutting component parts comprising the design on suitable piece goods.

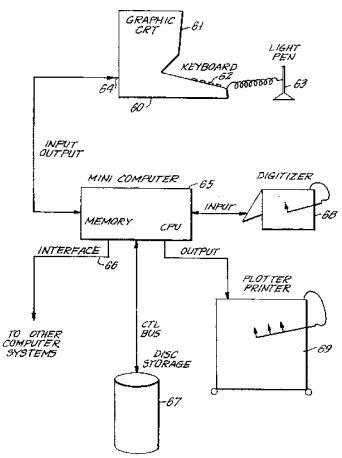

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–4 are cancelled.

* * * * *